United States Patent [19]

Sirois

[11] 4,054,304
[45] Oct. 18, 1977

[54] TRACTION ARMS FOR VEHICLE ANTI-SKID DEVICE

[75] Inventor: Rosaire J. Sirois, Caribou, Maine

[73] Assignee: Reneey Industries, Caribou, Maine

[21] Appl. No.: 617,290

[22] Filed: Sept. 29, 1975

[51] Int. Cl.² .............................................. B60S 9/00
[52] U.S. Cl. .................................. 280/757; 152/222;
  152/225 R; 188/1 B
[58] Field of Search .................... 280/757; 188/4 B;
  152/214, 215, 225 R, 222; 63/2; 180/1 R

[56] References Cited

U.S. PATENT DOCUMENTS

| 2,283,948 | 5/1942 | Ridgway | 188/4 B |
| 2,815,828 | 12/1957 | Schaefer | 188/4 B |
| 2,886,138 | 5/1959 | Bruner | 188/4 B |
| 3,068,949 | 12/1962 | Sirois | 188/4 B X |

Primary Examiner—Robert R. Song
Assistant Examiner—Michael J. Forman
Attorney, Agent, or Firm—David F. Gould

[57] ABSTRACT

Improved traction arms for vehicle anti-skid devices. The rollers or traction segments of the arms are mixed in size of outside diameter or provided with interior tipping bevels or both to give more traction.

2 Claims, 4 Drawing Figures

TRACTION ARMS FOR VEHICLE ANTI-SKID DEVICE

My invention relates to improved traction arms for vehicle anti-skid devices such as the one shown in my U.S. Pat. No. 3,068,949, issued Dec. 18, 1962. These improved traction arms are especially adapted for use in connection with vehicle anti-skid devices of the type having a hub rotatably mounted on a carrier rod which is in turn a mounted for swinging movement between a retracted position from a vehicle traction wheel and a position adjacent the lower portion of the traction wheel, a plurality of the traction arms each having one end secured to the hub and extending radially therefrom and adapted to have their end portions remote from the hub passed between the tread of the traction wheel and its supporting surface in sequence upon rotation of the hub and the traction wheel.

The traction arms comprising the instant invention are adapted to be used in connection with automobile traction devices such as that disclosed in my prior U.S. Pat. No. 3,068,949 and other automobile traction devices such as that disclosed by the patent to H. N. Ridgway, U.S. Pat. No. 2,283,948, dated May 26, 1942 in the place of the illustrated traction arms because of improved road gripping properties as will be hereinafter set forth.

The main object of this invention is to provide improved traction arms which will bite into ice and snow while retaining the semi-rigidity of the traction arm of the my U.S. Pat. No. 3,068,949.

A further object of this invention is to provide improved traction arms which eliminates one of the ball stops of my prior U.S. Pat. No. 3,068,949.

Still another object of this invention is minimize the number of different size segments or rollers which are used in the manufacture of traction arms.

These together with other objects and advantages which will become apparent reside in the details of construction and operation as more fully hereinafter described and claimed reference being had to the accompanying drawings forming a part hereof, wherein like numerals refer to like parts throughout, and in which:

Figure 1:
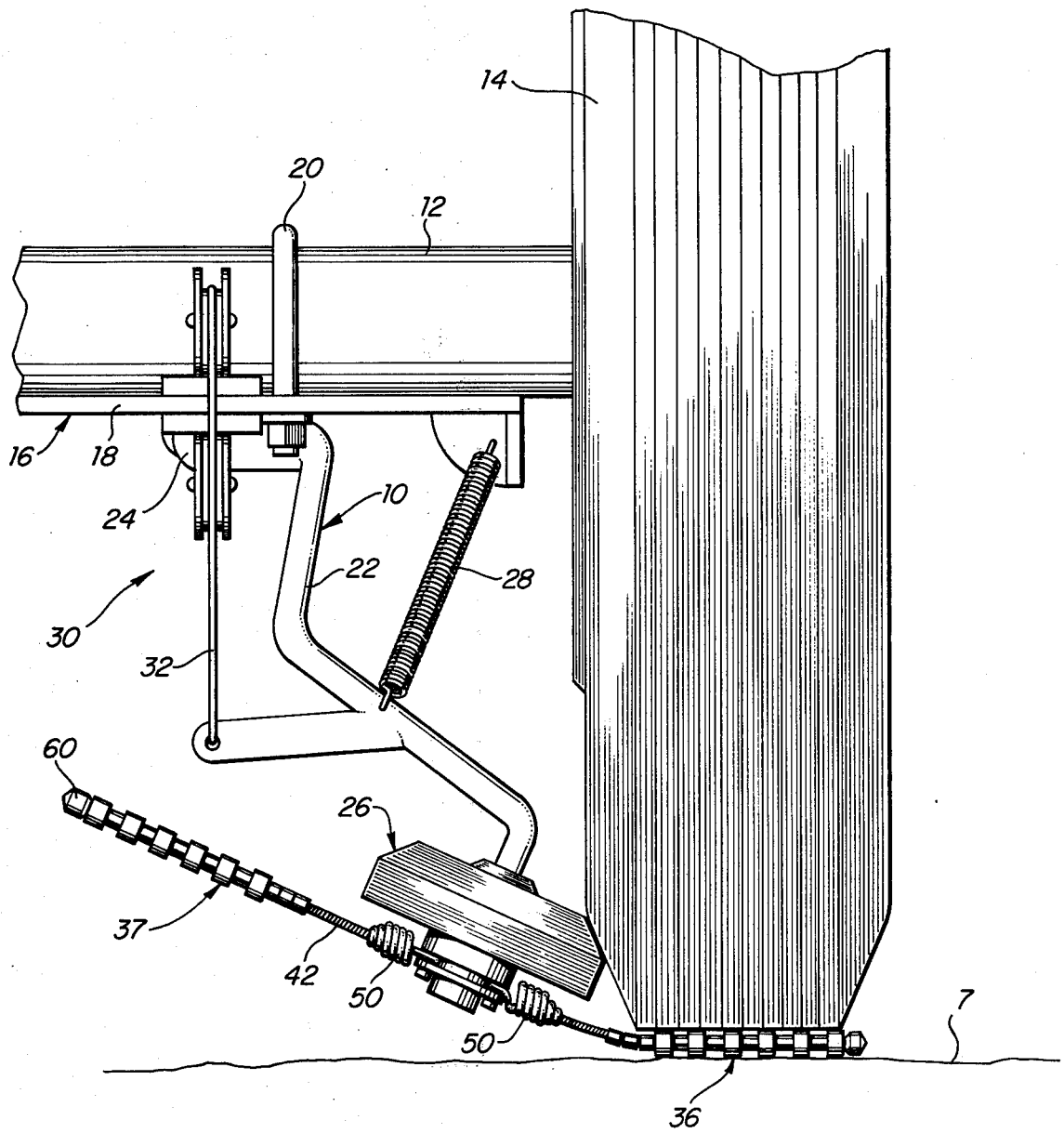
FIG. 1 is an elevational view of plurality of the improved traction arms of FIG. 2 shown mounted upon a rotatably mounted hub of an anti-skid attachment for vehicles as seen from the rear of one of the traction wheels of the vehicles.

With reference now more particularly to the drawings ther will be seen a conventional form of vehicle anti-skid traction device generally designated by the reference numeral 10 which is secured to an axle housing 12 supporting traction wheel 14. The attachment 10 includes a bracket assembly generally designated by the reference numeral 16 which includes a mounting plate 18 secured to the axle housing 12 by means of U-bolts such as U-bolt 20. The bracket assembly 16 has rotatably secured thereto one end of a carrier rod 22 by means of a bearing 24. The carrier rod 22 has rotatably journaled on its other end a hub generally designated by the reference numeral 26.

It is to be understood that the carrier rod 22 is swingable from a retracted position (notshown) remote from the traction wheel 14 to an operational position adjacent the traction wheel as shown in FIG. 1. Further, expansion spring 28 is secured to the carrier rod 22 intermediate its ends at one end and is secured to the bracket assembly 16 at its other end to yieldably urge the hub 26 towards an operational position adjacent the traction wheel 14.

An operating control generally designated by the reference numeral 30 which includes a flexible cable 32 is also secured to the carrier rod 22 for moving the carrier rod 22 towards an inoperational position and retaining the carrier rod 22 in that inoperational position. It is to be understood that the flexible cable 32 may terminate at a point adjacent to the driver of the vehicle (not shown) so that the same may be manipulated at the driver's will to retract the traction device to an inoperational position as when the vehicle is operating on bare pavement.

Figure 2:
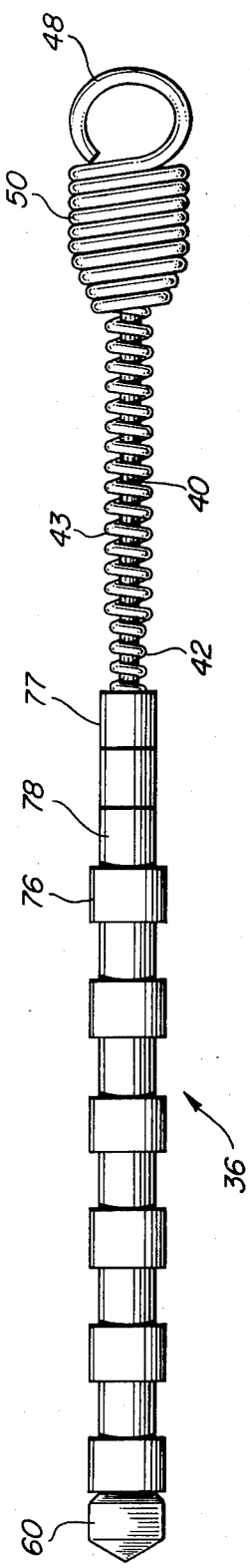
FIG. 2 is a side elevational view of one of the improved traction arms.
Figure 3:
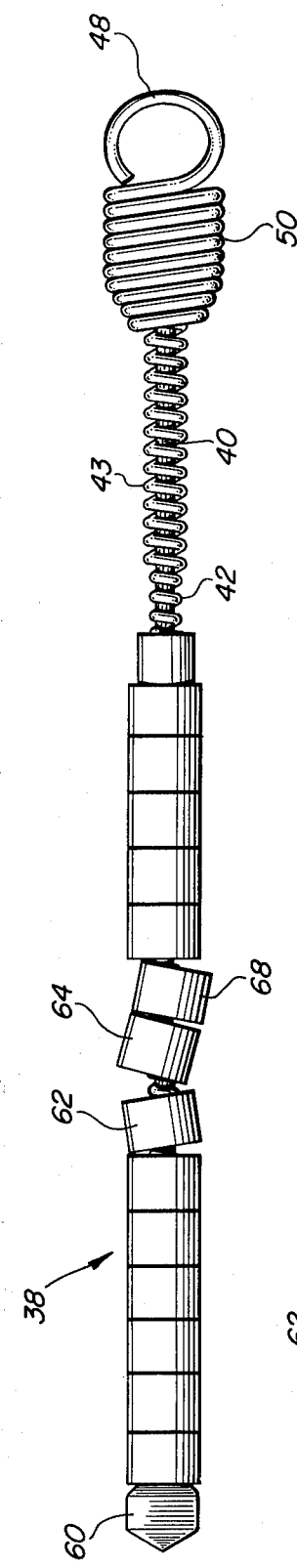
FIG. 3 is a side elevational view of another of the improved traction arms.
Figure 4:
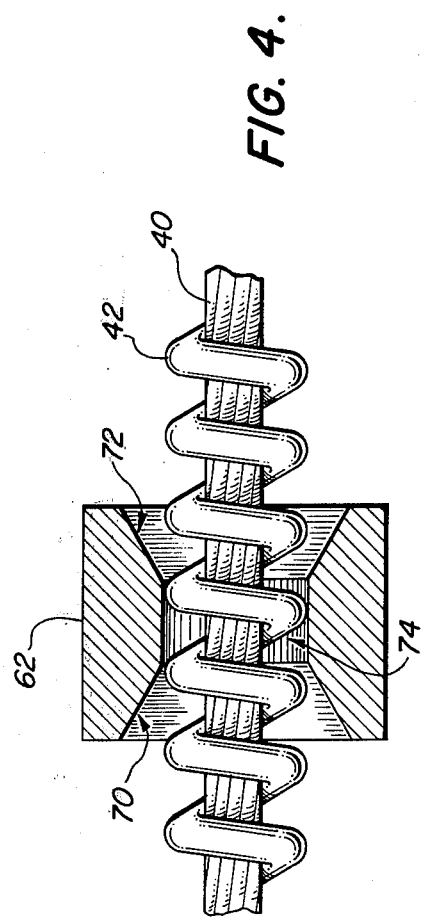
FIG. 4 is a partial vertical longitudinal sectional view substantially upon the longitudinal center line of any of the traction segments or rollers of the traction arm shown in FIG. 3.

With attention now directed more particularly to FIGS. 2 through 4 of the drawings, it will be noted that my improved traction arms are generally designated by the reference numerals 36 and 38 and that each includes a length of cable 40 comprised of a plurality of twisted strands of metallic wire. The cable 40 has wound tightly thereabout integral covolutions such as 42 and 43 of spring steel in order to increase the resiliency of the traction arms 36 and 38.

It will be noted that the spring convolution 42 is smaller than the spring convolution 43. This provides a stop for the traction segments or roller of the improved traction arms such as traction segment 77 of the FIG. 2. This stop keeps the traction segments at the end of the improved traction arms remote from the traction arm mounting loop 48. This stop eliminates one of the ball stops of my prior U.S. Pat. No. 3,068,949. The improved traction arms 36 and 38 may be resiliently secured to the hub 26 which is provided with a plurality of circumferentially spaced apertures (not shown) which are adapted to receive the closed loops 48 formed on one end of mounting springs 50.

The mounting springs 50 comprise expansion springs having the closed loops 48 formed integrally with the end convolution on one end of the springs. The other end of the expansion springs 50 are secured to the cable 40.

In FIG. 2 it will be seen that the end portion of the cable 40 remote from the spring 50 has rotatably journaled thereon a plurality of rollers or traction segments of dissimilar outside diameters such as rollers 76 and 78. The cable 40 is a common central core for the traction segments. The rollers are retained in side-by-side relation along the cable 40 by means of the aforemention stop formed by the juncture of small diameter spring convolution 42 and large diameter spring convolution 43. This stop is made in the spring at a distance from an end stop 60 sufficient to enable the placement of the desired number of rollers such as rollers 76 and 78 there between. There are fourteen rollers disclosed in FIG. 2 and it is to be noted that any desired number of rollers may be provided in addition to any desired length of cable 40 in order to assure that improved traction arm 36 will have a sufficient number of rollers to span the tread of a vehicle tire or of a dual wheel. Further it will be noted that the rollers alternate in size of outside diameter between roller 76 and end stop 60. I have found that by alternating the size of the rollers I can increase the traction between the vehicle wheel and the road surface 36. Also, the use of only two sizes of traction segments such as sizes 76 and 78 minimize the inventory of traction segments which must be used to produce a traction arm.

With particular attention now directed to FIGS. 3 and 4 of the drawings, it will be noted that my improved traction arms may be produced with only one side of traction segments. The necessary biting action between the road surface 36 and the vehicle tire is achieved by a random tipping action of the traction segments such as traction segments 62 and 64. It will be observed, that traction segment 62 tips to the left while traction segment 64 tips to the right. This random tipping action causes the corners of the traction segments to bite into the road surface and also into the vehicle tire.

The desired traction segment tipping action is achieved by bevels 70 and 72 on the inside of the traction segments as best seen in FIG. 4. The unbeveled central portion 74 of the traction segment 62 provides a center bearing. The traction segment 62 will tip either way, left or right on the spring convolutions 42.

The traction segments shown in FIG. 2 may also be beveled on their interior bores to provide a tipping action for increased traction.

It should be noted that traction segments that tip may be mixed with segments that do not tip if maximum biting action is not required.

With particular attention now directed to FIG. 1 of the drawings it will noted that the flexible cable 40 may flex laterally of its longitudinal axis in order to be better positioned beneath traction wheel 14 of a vehicle. Further, in operation, tension is released on the flexible cable 32 which enables the expansion spring 28 to urge the carrier rod 22 towards the operational position which positions the hub 26 adjacent to and in contact with, the lower position of the traction wheel 14. Then, upon the initial rotation of the traction wheel 14 the rollers or traction segments of the traction arm 36 will be rolled beneath the traction wheel 14 thereby rotating the hub 26 and positioning the next traction arm 37 in position to pass between the traction wheel 14 and the supporting surface 7.

It will be understood that the resiliency of the cable 42 and springs 50 not only enables the traction arms 36 and 37 to encounter obstacles such as rocks and holes without damage thereto, but also enables that portion of the traction arm to conform to the contour of the supporting surface 7.

The coil springs 50 not only enable the traction arms 36 and 37 to be laterally deflexed relative to their normal position but also enables a certain degree of resiliency with respect to the length of the traction arms 36 and 37 thereby greatly reducing wear upon the traction arms 36 and 37 and the traction wheel 14.

The foregoing is considers as illustrative only of the principles of the invention. Furthermore since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a traction arm for a vehicle anti-skid device of the type having a hub rotatably mounted on a carrier, said carrier being mounted for swinging movement between a retracted position remote from a vehicle traction wheel and a position adjacent the lower portion of the traction wheel the improvement comprising: a plurality of traction segments slidably mounted on a common central core, at least one of the traction segments beveled internally to enable it to tip on the common central core, stop means on the common central core at each end of the plurality of traction segments to maintain the traction segments on the common central core, said common central core having flexibility to allow the plurality of traction segments to conform to road and traction wheel contours, and means to attach the common central core to the hub.

2. The traction arm of claim 1 wherein the common central core is covered with a coil spring having large and small convolutions, said traction segments having holes axially therethrough of a diameter larger than the small convolutions but smaller than the large convolutions, said traction segments axially mounted on the small spring convolutions, the large spring convolutions located adjacent one end of the common central core and forming a stop member for the traction segments.

* * * * *